US012768767B2

(12) United States Patent
Stahlfeld et al.

(10) Patent No.: US 12,768,767 B2
(45) Date of Patent: Oct. 20, 2026

(54) METHOD AND SYSTEM FOR QUANTIFYING POROUS MATERIAL

(71) Applicant: University of Wyoming, Laramie, WY (US)

(72) Inventors: Kurt W Stahlfeld, Laramie, WY (US); Erica L Belmont, Laramie, WY (US)

(73) Assignee: University of Wyoming, Laramie, WY (US)

( * ) Notice: Subject to any disclaimer, the term of this patent is extended or adjusted under 35 U.S.C. 154(b) by 0 days.

(21) Appl. No.: 19/102,255

(22) PCT Filed: Aug. 8, 2023

(86) PCT No.: PCT/US2023/071861
§ 371 (c)(1),
(2) Date: Feb. 7, 2025

(87) PCT Pub. No.: WO2024/036164
PCT Pub. Date: Feb. 15, 2024

(65) Prior Publication Data

US 2026/0009714 A1 Jan. 8, 2026

Related U.S. Application Data

(60) Provisional application No. 63/396,064, filed on Aug. 8, 2022.

(51) Int. Cl.
*G01N 15/08* (2006.01)

(52) U.S. Cl.
CPC . *G01N 15/0893* (2013.01); *G01N 2015/0833* (2013.01); *G01N 2015/0866* (2013.01)

(58) Field of Classification Search
CPC .... G01N 15/0893; G01N 15/08; G01N 15/00; G01N 1/405; G01N 1/28;
(Continued)

(56) References Cited

U.S. PATENT DOCUMENTS

| | | | | |
|---|---|---|---|---|
| 10,258,979 | B2 * | 4/2019 | Brousmiche | B01J 39/20 |
| 2015/0298984 | A1 * | 10/2015 | Strömme | A61K 47/02 423/430 |
| 2021/0033515 | A1 * | 2/2021 | Schimmel | G01N 15/08 |

FOREIGN PATENT DOCUMENTS

| | | | | |
|---|---|---|---|---|
| JP | 2018504298 A * | 2/2018 | | B32B 27/34 |
| WO | WO-2018187507 A1 * | 10/2018 | | B01J 31/1691 |

(Continued)

OTHER PUBLICATIONS

Azo Materials. "Discovery TGA series from TA Instruments" Website (online). Jan. 29, 2013, 3 Pages.

(Continued)

*Primary Examiner* — Stephanie E Bloss

(74) *Attorney, Agent, or Firm* — Goodhue, Coleman & Owens, P.C.

(57) ABSTRACT

The processes, systems, and methods for quantifying porous material are disclosed. A porous solid adsorbs an adsorbate. The saturated porous solid is heated and an isotherm may be generated such as from measured adsorbate mass loss. The type of isotherm is identified, and subsequent analysis may be performed to calculate specific surface area, pore size distribution, and pore volume. The specific type of subsequent analysis, such as derivation of a BET transform and application of BET theory, depends on the type of isotherm. This allows the porous material to by quantified using a variety of different adsorbates.

20 Claims, 10 Drawing Sheets

(58) Field of Classification Search
CPC .. G01N 2291/0256; G01N 33/00; G01N 7/04; G01N 7/10; G01N 2015/0833; G01N 2015/0866; G01N 2015/0873; G06T 7/40; G06T 7/60; C01P 2006/12; C01P 2006/17; C01P 2006/16; C01P 2006/14; C01P 2006/19; C01P 2002/88
USPC ..... 73/73; 702/82, 38, 152.05, 865.5, 28.01, 702/866, 53.01, 198, 37.5, 1, 127, 24, 702/189
See application file for complete search history.

(56) References Cited

FOREIGN PATENT DOCUMENTS

| | | | | |
|---|---|---|---|---|
| WO | WO-2019082995 A1 * | 5/2019 | .......... | C07D 303/04 |
| WO | WO-2022265004 A1 * | 12/2022 | .......... | C23C 16/045 |

OTHER PUBLICATIONS

Foquet, TNJ et al. "Porosity & Pore Size Distribution by Thermoporometry—a First Step" Advanced Materials & Structures (AMS). Mar. 2014, 1 Page.
Hassan, Met al. "Adsorption of Perfluorooctane sulfonate (PFOS) onto metal oxides modified biochar" Environmental Technology & Innovation. vol. 19. Aug. 2020; p. 19, first paragraph.
International Preliminary Report on Patentability (Ch. II of the Patent Cooperation Treaty) (Rule 71.1) | PCT/US23/71861 | Aug. 16, 2024 | 17 Pages.
International Search Report and Written Opinion, PCT/US23/71861, Jan. 22, 2024, 16 Pages.
Bennett, T. D., Coudert, F. X., James, S. L. & Cooper, A. I. The changing state of porous materials. Nat. Mater. 2021 209 20, 1179-1187 (2021).
Brunauer, S., Emmett, P. H. & Teller, E. Adsorption of Gases in Multimolecular Layers. J. Am. Chem. Soc. 60, 309-319 (1938).
Farha, O. K. et al. De novo synthesis of a metal-organic framework material featuring ultrahigh surface area and gas storage capacities. Nat. Chem. 2, 944-948 (2010).
Landers, J., Gor, G. Y. & Neimark, A. V. Density functional theory methods for characterization of porous materials. Colloids Surfaces A Physicochem. Eng. Asp. 437, 3-32 (2013).
Liu, H. & Cao, G. Effectiveness of the Young-Laplace equation at nanoscale. Sci. Rep. 6, 1-10 (2016).
Odell Wood, G. Activated carbon adsorption capacities for vapors. Carbon vol. 30 593-599 (1992).
Raoof, A., Guilbaud, J. P., Van Damme, H., Porion, P. & Levitz, P. Analysis of the multilayer thickness relationship for water vapor and nitrogen adsorption. J. Colloid Interface Sci. 206, 1-9 (1998).
Thommes, M. et al. Physisorption of gases, with special reference to the evaluation of surface area and pore size distribution (IUPAC Technical Report). Pure Appl. Chem. 87, 1051-1069 (2015).
Züttel, A. Materials for hydrogen storage. Mater. Today 6, 24-33 (2003).
Barrett, E. P., Joyner, L. G. & Halenda, P. The Determination of Pore Volume and Area Distributions in Porous Substances. J. Am. Chem. Soc. 73, 373-380 (1951).
Davis, M. E. Ordered porous materials for emerging applications. Nature 417, 813-821 (2002).
Foley, N. J., Thomas, K. M., Forshaw, P. L., Stanton, D. & Norman, P. R. Kinetics of Water Vapor Adsorption on Activated Carbon. Langmuir (1997), 13, 2083-2089.
Ghiaci, M., Abbaspur, A., Kia, R. & Seyedeyn-Azad, F. Equilibrium isotherm studies for the sorption of benzene, toluene, and phenol onto organo-zeolites and as-synthesized MCM-41. Sep. Purif. Technol. 40, 217-229 (2004).
Giusti, D. M., Conway, R. A. & Lawson, C. T. Activated carbon adsorption of petrochemicals. J. Water Pollut. Control Fed. 46, 947-965 (1974).
Hagymassy, J., Brunauer, S. & Mikhail, R. S. Pore structure analysis by water vapor adsorption. J. Colloid Interface Sci. 29, 485-491 (1969).
Hudec, P., Smiešková, A. & Jorík, V. Sensitivity of the C-constant of BET-isotherm to the content of micropore volume in mesoporous matrix. Stud. Surf. Sci. Catal. 174, 981-984 (2008).
Lillo-Ródenas, M. A., Cazorla-Amorós, D. & Linares-Solano, A. Benzene and toluene adsorption at low concentration on activated carbon fibres. Adsorption 17, 473-481 (2011).
Lind, C. S. The Fixed Nitrogen Research Laboratory. in vol. 22 196-216 (1926).
McClellan, A. L. & Harnsberger, H. F. Cross-sectional areas of molecules adsorbed on solid surfaces. J. Colloid Interface Sci. 23, 577-599 (1967).
Monson, P. A. Understanding adsorption/desorption hysteresis for fluids in mesoporous materials using simple molecular models and classical density functional theory. Microporous Mesoporous Mater. 160, 47-66 (2012).
Rouquerol, J., Llewellyn, P. & Rouquerol, F. Is the BET equation applicable to microporous adsorbents? Stud. Surf. Sci. Catal. 160, (2007) 1 page.
Silva, L. L., Cardoso, D., Sievers, C. & Martins, L. Evolution of Structure and Active Sites during the Synthesis of ZSM-5: From Amorphous to Fully Grown Structure. J. Phys. Chem. C 124, 2439-2449 (2020).
Tham, Y. J., Latif, P. A., Abdullah, A. M., Shamala-Devi, A. & Taufiq-Yap, Y. H. Performances of toluene removal by activated carbon derived from durian shell. Bioresour. Technol. 102, 724-728 (2011).
Thommes, M. & Cychosz, K. A. Physical adsorption characterization of nanoporous materials: Progress and challenges. Adsorption 20, 233-250 (2014).
Wang, X. et al. Key factors and primary modification methods of activated carbon and their application in adsorption of carbon-based gases: A review. Chemosphere 287, 131995 (2022), 19 pages.
Yang, Q. et al. Capillary condensation under atomic-scale confinement. Nature 588, 250-253 (2020).

* cited by examiner

METHOD AND SYSTEM FOR QUANTIFYING POROUS MATERIAL

CROSS-REFERENCE TO RELATED APPLICATIONS

This application claims priority under 35 U.S.C. § 119 to provisional application Ser. No. 63/396,064 filed on Aug. 8, 2022, which is incorporated by reference in its entirety.

FIELD OF THE DISCLOSURE

The present disclosure relates to porous material. More particularly, but not exclusively, the present disclosure relates to a method and system for quantifying porous material.

BACKGROUND

Porous solids with nanometer-sized pores and large specific surface areas are a highly important class of materials. Uses of such porous solids include filtration, battery electrodes, catalyst supports, and carbon sequestration. These porous solids are characterized by their specific surface areas, typically >100 $m^2/g$, and pore size distributions. These parameters are typically measured using cryogenic adsorption of nitrogen, argon, or other adsorbates, a physisorption technique often paired with Brunauer-Emmett-Teller (BET) analysis. This method quantifies how a particular solid will interact with cryogenic adsorbates, but this is often a poor predictor of how that solid will interact with other adsorbates, greatly limiting the applicability of these results. Nevertheless, this method remains the standard technique due to lack of other options. Therefore, what is needed is a system and method for quantifying porous material to determine how effective the material will be for various uses.

SUMMARY

Therefore, it is a primary object, feature, or advantage of the present disclosure to improve over the state of the art.

It is a further object, feature, or advantage of the present disclosure to quantify porous solids using various adsorbates.

It is a still further object, feature, or advantage of the present disclosure to use elevated temperatures to generate isotherms.

Another object, feature, or advantage is to use elevated temperatures to quantify a porous solid.

Yet another object, feature, or advantage is to determine if a BET transform can be calculated for a porous solid.

In one aspect of the present disclosure, a method for quantifying porous material or porous solids is disclosed. The method may include placing a porous solid in a saturator. The method may also include adsorbing an adsorbate by the porous solid to form a saturated porous solid. The method may further include heating the saturated porous solid to desorb the adsorbate. The method may also include generating an isotherm such as from measured adsorbate mass loss. The method may further include determining if a BET transform can be calculated utilizing the isotherm. The method may also include calculating a BET constant if the BET transform is calculated and calculating a surface area and pore size distribution even if the BET transform is not calculated.

In another aspect of the present disclosure, another method for quantifying porous solids is disclosed. The method may include placing a porous material in a sealed saturator. The method may also include saturating the porous material with an adsorbate in the sealed saturator. The method may include placing the saturated porous material in a thermogravimetric analysis (TGA) machine. The method may further include heating the saturated porous material in the TGA machine. The heating step may include heating the saturated porous material to a first temperature and then heating the saturated porous material to a second temperature. The method may further include generating an isotherm such as from mass loss measured from the heated saturated porous material and determining if a BET transform may be calculated utilizing the isotherm.

In another aspect of the present disclosure a system for quantifying porous material is disclosed. The system may include a porous solid. The system may also include an adsorbate. The adsorbate may include at least one of a gas, a liquid, or a dissolved solid. The system may also include a saturator. The saturator may be configured to saturate the porous solid with the adsorbate. The system may also include a thermal analyzer machine configured to heat the saturated porous solid and measure mass loss data, from which an isotherm may be generated. The isotherm may determine if a BET transform of the porous solid can be calculated.

One or more of these and/or other objects, features, or advantages of the present disclosure will become apparent from the specification and claims that follow. No single embodiment need provide each and every object, feature, or advantage. Different embodiments may have different objects, features, or advantages. Therefore, the present disclosure is not to be limited to or by any objects, features, or advantages stated herein.

BRIEF DESCRIPTION OF THE DRAWINGS

Illustrated embodiments of the disclosure are described in detail below with reference to the attached drawing figures, which are incorporated by reference herein.

BRIEF DESCRIPTION OF THE TABLES

Figure 1:
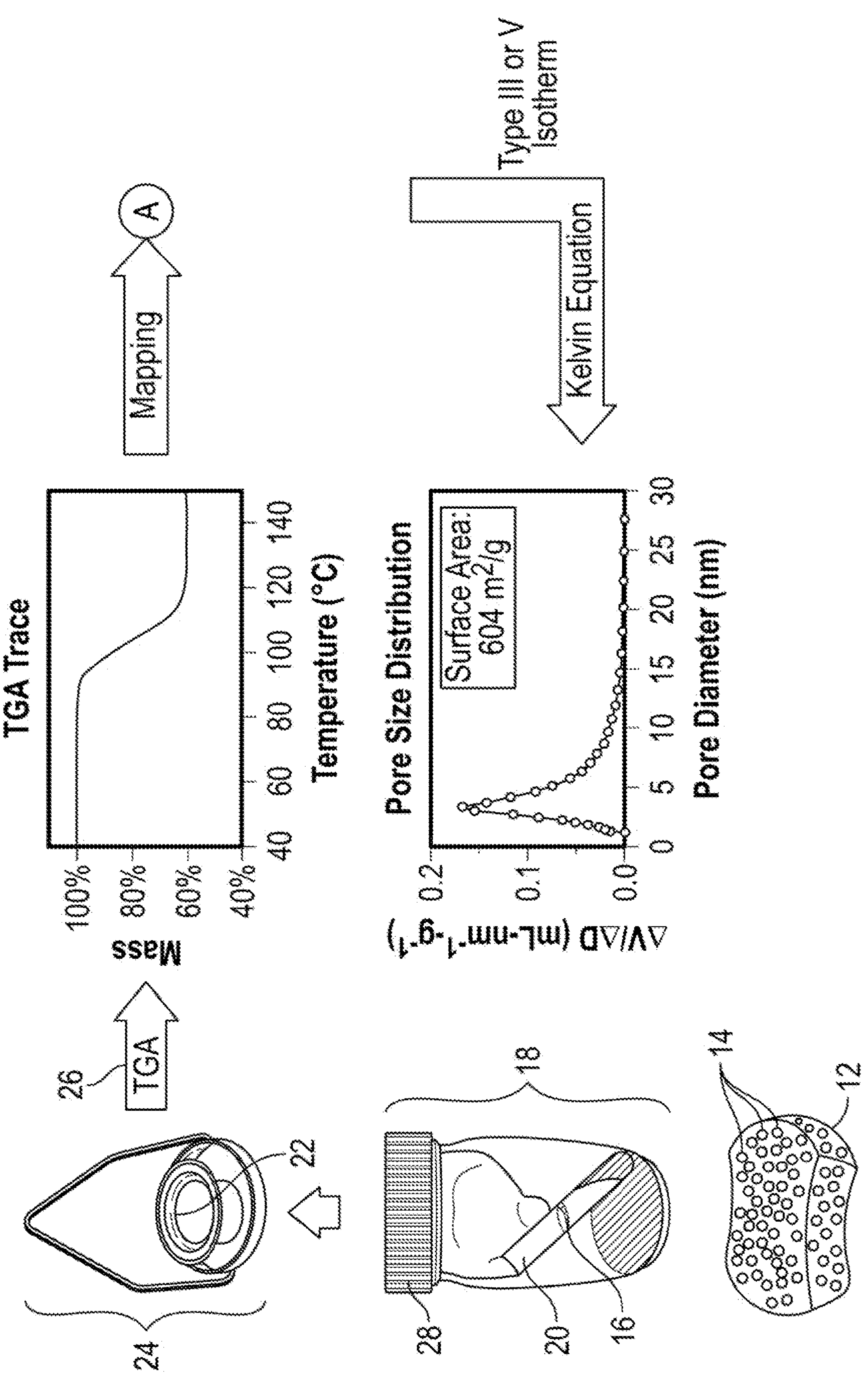
FIG. 1 is an illustration of the system for quantifying porous material in accordance with one aspect of the present disclosure.
Figure 1:
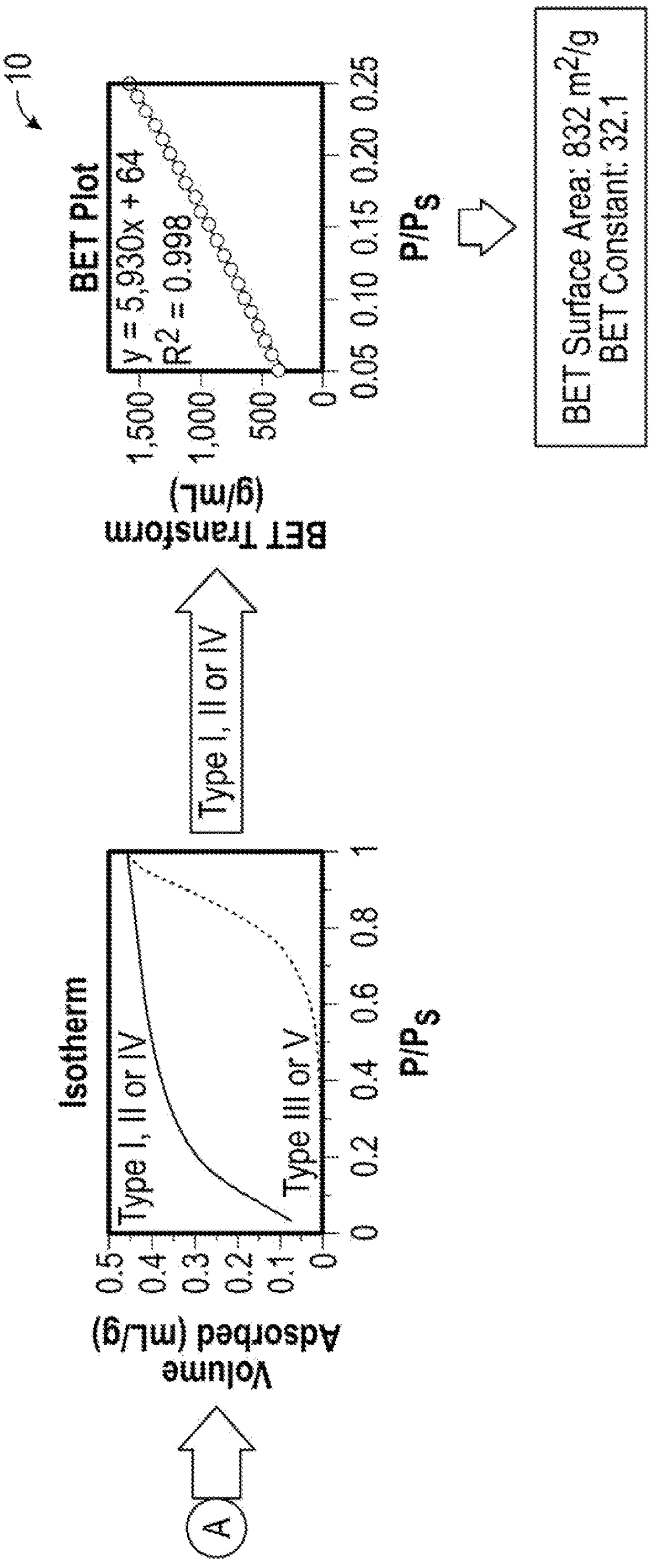

Illustrated aspects of the disclosure are described in detail below with reference to attached Tables, which are incorporated by reference herein and where:

Table 1 provides specific surface areas derived from isotherms of nitrogen, argon, water, and toluene on a molecular sieve and activated carbon in accordance with one aspect of the present disclosure.

Table 2 provides BET constants for a molecular sieve and activated carbon with nitrogen, argon, water, and toluene adsorbates in accordance with one aspect of the present disclosure.

Table 3 provides the pore volumes and specific surface areas for silica gel derived from isotherms of water, toluene, and nitrogen in accordance with one aspect of the present disclosure.

Table 4 provides the specific surface areas and pore volumes for MCM-41 derived from isotherms of water, toluene, and nitrogen in accordance with one aspect of the present disclosure.

Table 5 provides the temperature methods used for TGA desorption and analysis methods applied to derived isotherms, categorized by IUPAC isotherm Type.

Table 6 provides the contact angles measured and used for Kelvin analysis.

DETAILED DESCRIPTION

Porous solids represent a wide range of highly important materials with diverse uses including filtration, catalyst support, drug delivery, carbon removal, hydrogen storage, and electrochemical applications such as battery electrodes. The adsorption of water by porous solids has broad importance in chemical engineering, catalysis, and material science. The physically or chemically adsorbed water on the surface of porous solids may play an important role in governing interface properties, chemical reaction pathways, or catalytic performance. Protein and surfactant adsorption play a fundamental role in the biomaterials field. Biological media, such as blood or serum, coat the biomaterial porous solid with proteins. This protein layer mediates the interaction between the biomaterial and cells. Surfactant adsorption is similar, utilizing surfactant molecules in the place of proteins.

The pores within porous solids can range in size over several orders of magnitude from micropores (<2 nm) to mesopores (2-50 nm) to macropores (>50 nm). Accurate analysis of the specific surface areas (SSAs) and size distribution of pores for porous solids is critical for understanding these materials and their applications. Direct measurement of SSAs and pore sizes is generally not possible due to the small pore size and three-dimensionality of porous solids. Instead, physisorption is the most common method employed for the characterization of these porous solids. Physisorption typically proceeds as follows: a sample of the porous solid material is placed under vacuum and cooled to cryogenic temperature. A small amount of an adsorptive gas is introduced to the solid and the pressure increase is measured, allowing for the amount of gas adsorbed onto the solid to be calculated. Additional gas is incrementally added, with the amount of adsorbed gas measured at each step. This produces a plot of amount of gas adsorbed versus the relative pressure, typically called an isotherm.

Various theories can be applied to an isotherm to calculate the specific surface area and pore size distribution of the solid. The most famous and widely used of these is BET theory, named after the authors who developed it in 1938. BET theory applies a mathematical model to the formation of a multilayer of gas molecules adsorbed onto the surface of a porous solid and calculates a surface area. Pore size distributions can also be calculated from physisorption isotherms, commonly done using the Kelvin equation-based Barrett-Joyner-Halenda (BJH) method developed by Barrett et al. in 1951 or newer methods such as non-local density functional theory.

Despite its widespread use, cryogenic physisorption has significant limitations. Physisorption is most commonly conducted using nitrogen at −196° C. and in a pressure range of $10^{-7}$ to 1 atm. The rate of diffusion of adsorptive gasses is slow at these conditions, making it difficult to accurately measure equilibrium isotherms. These kinetic limitations are especially pronounced for microporous materials with pore diameters <2 nm, and isotherms produced from these materials are frequently of limited value. The choice of adsorptive molecule is also limiting. As historical context, Brauner et al. logically chose nitrogen (N2) as the adsorptive gas for their famous study of iron catalysts for nitrogen fixation, and nitrogen has remained as the most commonly used adsorptive. However, nitrogen has specific interactions with certain surface functional groups and exposed ions due to its quadrupolar nature, which shifts the isotherm to the low-pressure regime and causes both experimental difficulties due to extremely low pressure and analysis issues.

Use of argon at −186° C. is now recommended by the International Union of Pure and Applied Chemistry (IUPAC) instead of nitrogen because argon does not exhibit specific interactions with surface functional groups, thereby overcoming some of the issues incurred with nitrogen, but argon is still used less frequently than nitrogen due to cost. Additionally, argon still incurs the kinetic limitations noted above for nitrogen due to the required cryogenic temperatures. Physisorption is also performed with other gases but, in all cases, results only reflect how that particular gas interacts with a porous material, and this behavior may or may not be applicable to other chemicals of relevance to that material.

The processes, systems, and methods of the present disclosure show that surface areas and pore size distributions of porous solids can be determined by thermogravimetric desorption using only a thermogravimetric analyzer (TGA), and in a high throughput manner. The processes, systems, and methods of the present disclosure show that BET theory can be applied to thermal desorption, and BET constants, which are non-dimensional measures of adsorbate-adsorbent interaction strength, can be calculated for different adsorbate-adsorbent systems. Additionally, the processes, systems, and methods of the present disclosure show that multilayer formation does not occur for an important class of porous solids, desiccants, with some adsorbates, in contrast to results suggested by nitrogen physisorption; instead, adsorption occurs exclusively or predominantly by capillary condensation. For these materials, the Kelvin equation can be applied to determine pore size distributions and surface areas.

A novel approach for deriving isotherms using thermogravimetric desorption of adsorbates from porous solids is disclosed. For systems which exhibit multilayer formation, BET theory can then be applied to determine surface areas from the isotherms along with BET constants. For systems where multilayer formation does not occur, BET theory is not applicable and the Kelvin equation can be applied to generate pore size distributions along with surface areas. The novel method disclosed may use elevated temperatures of approximately 100-500° C., thereby avoiding kinetic limitations associated with cryogenic physisorption.

This method can be conducted with many different adsorbates, or substances that are deposited on the surface of another substance, including those of particular relevance to applications of the porous solids. An adsorbate may include any gas, liquid, or dissolved solid. The atoms, ions, or molecules from the adsorbate adhere to a surface of the adsorbent, creating a film. This unique aspect of the method allows the specific interaction between a porous solid, or adsorbent, and an adsorbate of interest to be analyzed. The novel approach may be demonstrated with water and toluene, or other adsorbates on several porous solids or other adsorbents. This method may work with many relevant adsorbate/adsorbent systems.

Adsorbents may include oxygen containing compounds, carbon-based compounds, metal organic framework compounds, or polymer-based compounds. The adsorbents may be a powder or in the form of spherical pellets, rods, moldings or monoliths. The adsorbent may have a hydrodynamic radius. The adsorbent may have high abrasion resistance, high thermal stability or small pore diameters to allow for a higher exposed surface area or a higher capacity for adsorption. Oxygen containing compounds may be typically hydrophilic or polar. The oxygen-containing compounds may include silica gel, limestone or calcium carbonate, or zeolites. The carbon-based compounds may be hydrophobic or non-polar and may include activated carbon or graphite. The polymer-based compounds may be polar or non-polar depending on the functional groups in the polymer matrix. Zeolites and metal-organic framework compounds are adsorbents typically selected for carbon capture and storage.

Figure 11:
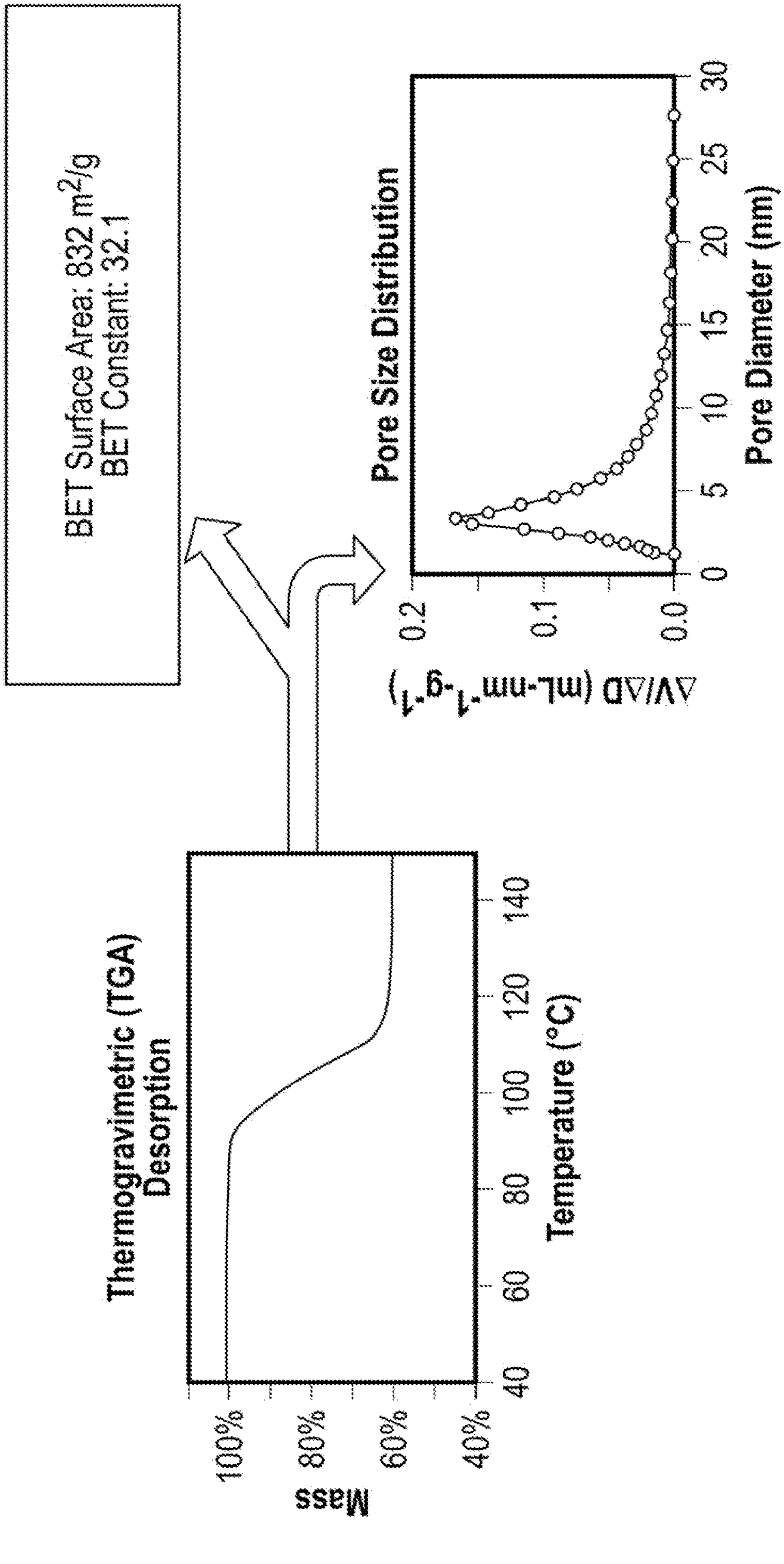
FIG. 11 is a chart illustrating the thermogravimetric desorption method for calculation of porous solid SSA in accordance with one aspect of the present disclosure.

FIG. 1 illustrates a summary of the thermogravimetric desorption method for calculation of porous solid specific surface area, as well as either a BET constant or a pore size distribution depending on the isotherm type for the tested adsorbent/adsorbate system in accordance with one aspect of the present disclosure. A process schematic 10 for thermogravimetric determination of isotherms, and subsequent analysis of those isotherms to derive specific surface area and either a BET constant or a pore size distribution depending on the appropriate analysis for the tested adsorbent/adsorbate system in accordance is shown. Porous solids 12, having a multitude of pores 14, are first saturated with the adsorbate 16 in a saturator 18. The saturator 18 may be a bench top saturator. The saturator 18 may include a porous solid holder 28, such as a glass jar, containing the porous solid 12 and a test tube or an adsorbate holder 20 filled with the liquid adsorbate 16 to saturate the porous solid 12. The saturated porous solid 22 may be loaded into a sample pan 24. The sample pan or the TGA may have a heating element 26, such as a TGA furnace. The loaded sample pan 24 may be heated while the sample mass loss is measured using a thermogravimetric analyzer (TGA). The volume of liquid adsorbed onto the solid as a function of temperature can be calculated from the TGA mass-temperature trace. This volume-temperature plot may be mapped into a physisorption isotherm. The physisorption isotherm may be defined as adsorbed volume plotted against relative pressure ($P/P_S$) where P is the partial pressure of the adsorptive gas and $P_S$ is the saturation vapor pressure of the adsorptive gas at a given temperature. FIG. 11 provides another summary of the thermogravimetric desorption method for calculation of porous solid specific surface area.

In one aspect of the present disclosure, P is equal to ambient pressure (e.g., 1 atm at sea level and 0.78 atm in Laramie, WY) and $P_S$ is a function of temperature which can be readily calculated from tabulated thermodynamics data. The produced isotherm may then be analyzed to determine its Type classification. Types I, II and IV isotherms show large increases in volume adsorbed as $P/P_S$ increases from 0 to ~0.2, while Types III and V show minimal, or no volume adsorbed in this region. For Type I, II and IV isotherms, BET theory may be applicable and the BET transform can be applied to calculate a porous solid specific surface area and BET constant. For Type III and V isotherms, the adsorbent-adsorbate interaction may be too weak for multilayer formation and BET theory is not valid. For these isotherms, the Kelvin equation can be applied to calculate pore size distribution and specific surface area.

Figure 2:
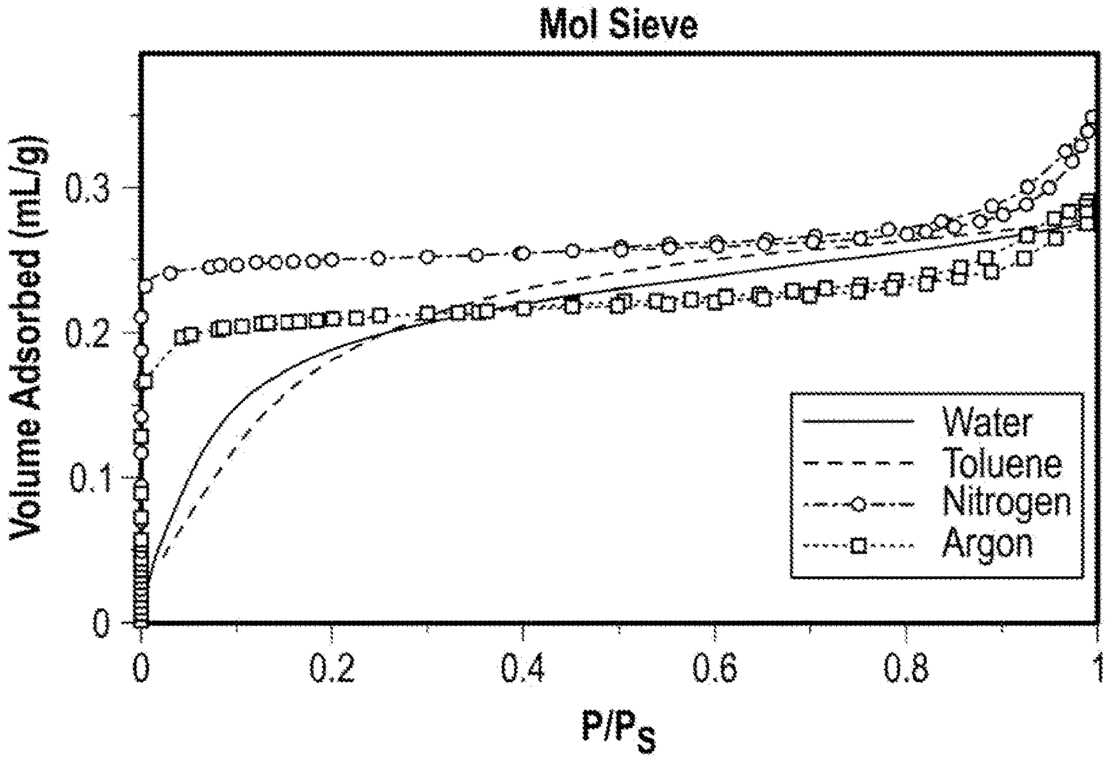
FIG. 2 is a chart illustrating isotherms of nitrogen, argon, water, and toluene on a 13× molecular sieve (mol sieve) in accordance with one aspect of the present disclosure.

Isotherms derived from thermogravimetric desorption of toluene and water adsorbed on 13× molecular sieve (mol sieve) are shown in FIG. 2. Nitrogen and argon physisorption were conducted using conventional cryogenic techniques and are also shown in FIG. 2. Toluene and water isotherms on the mol sieve show Type I behavior with large increases in volume adsorbed from $P/P_S$ of 0 to 0.2 followed by a relatively constant slope to $P/P_S$ of unity. The nitrogen and argon isotherms show Type II behavior with a sharp increase in volume adsorbed occurring at $P/P_S$ less than 0.005, followed by a plateau to $P/P_S$ of 0.8 then a slight increase at $P/P_S$ greater than 0.9. Slight hysteresis is observed for nitrogen and argon at high $P/P_S$, indicating pore filling by capillary condensation. In contrast, no hysteresis loop can be observed in the thermogravimetric desorption-derived curves as this method only provides insights into the desorption branch of the isotherm. Thermodynamic equilibrium is established on the desorption branch. Water, toluene, and argon all show a maximum adsorbed volume or available pore volume of approximately 0.27 mL/g, while nitrogen shows an available pore volume of 0.35 mL/g, demonstrating that accessible pore volume is dependent on the choice of adsorbate.

Figure 3:
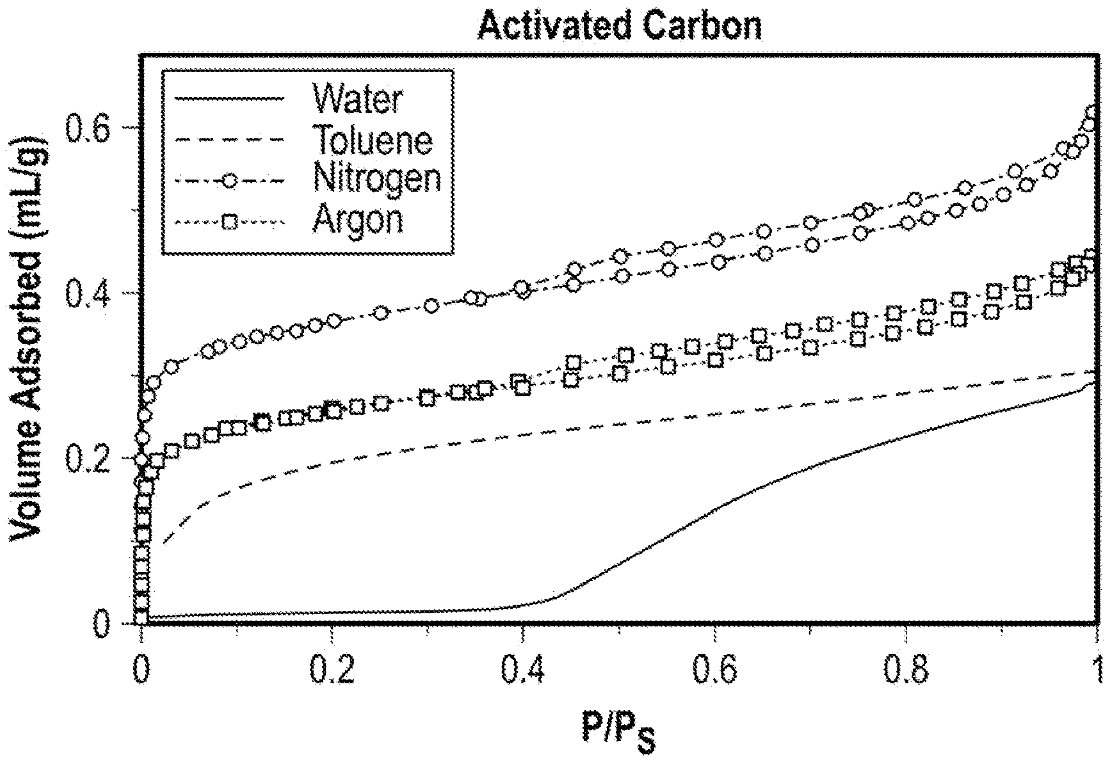
FIG. 3 is a chart illustrating isotherms of nitrogen, argon, water, and toluene on activated carbon in accordance with one aspect of the present disclosure.

Isotherms derived from thermogravimetric desorption of water and toluene and cryogenic physisorption of nitrogen and argon on activated carbon are shown in FIG. 3. Toluene exhibits the same Type I behavior as seen on mol sieve. In contrast, the isotherm of water adsorbed on activated carbon shows essentially no volume adsorbed at $P/P_S<0.4$ and is best described as a modified Type V isotherm. This behavior can be attributed to weak adsorbent-adsorbate interactions and is typical of water adsorption on hydrophobic microporous adsorbents. Water and toluene isotherms on activated carbon both show available pore volumes of approximately 0.30 mL/g, argon shows 0.44 mL/g, and nitrogen shows 0.62 mL/g. The adsorption characteristics and available pore volumes of activated carbon are clearly dependent on adsorbate identity. Considering that adsorption of aromatic chemicals is a major application of activated carbon, the measurement of pore volume available to relevant chemical species is highly important. The results show that nitrogen physisorption overestimates the adsorption capacity of activated carbon for toluene by 106%, while argon overestimates by 47%.

BET Analysis

Figure 4:
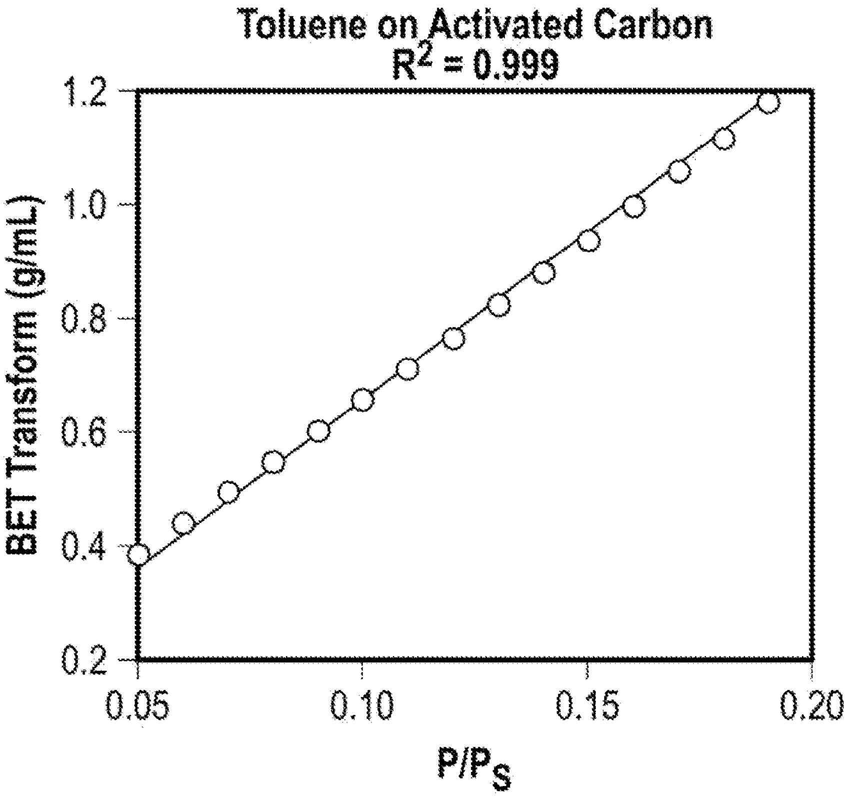
FIG. 4 is a chart illustrating BET transforms and linear fits of toluene on activated carbon in accordance with one aspect of the present disclosure.
Figure 5:
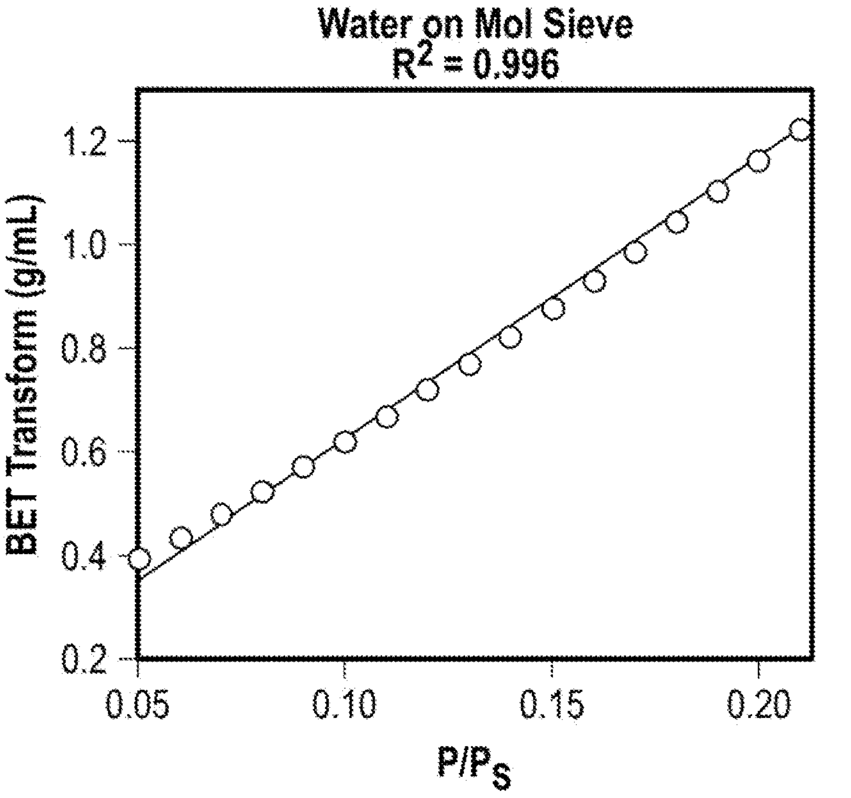
FIG. 5 is a chart illustrating BET transforms and linear fits of water on a 13× mol sieve in accordance with one aspect of the present disclosure.
Figure 6:
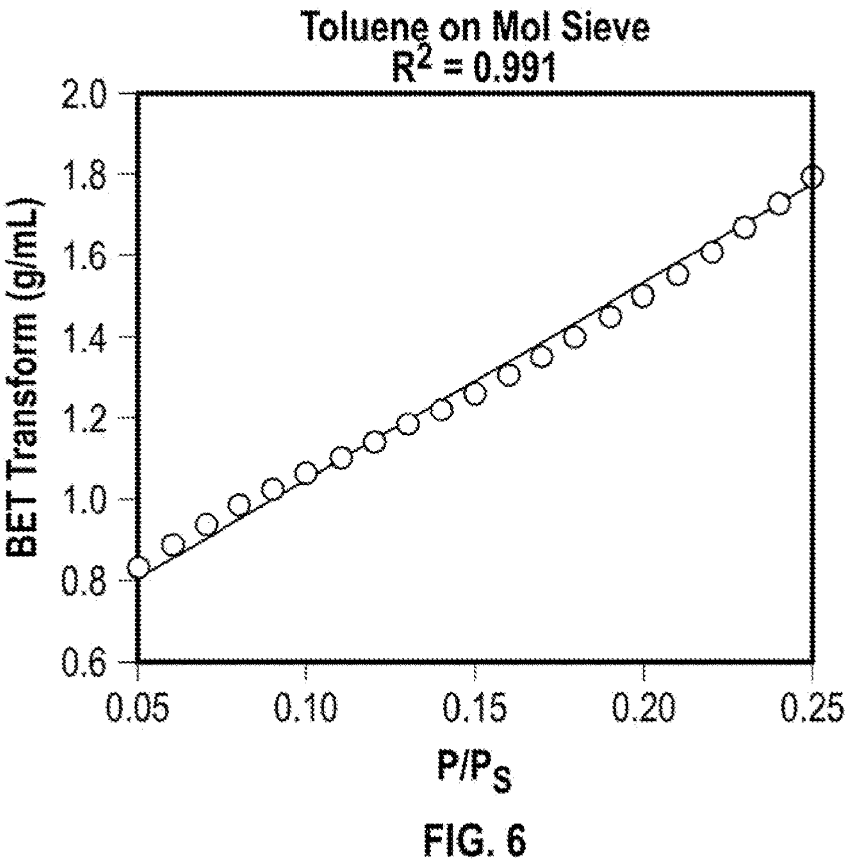
FIG. 6 is a chart illustrating BET transforms and linear fits of toluene on a 13× mol sieve in accordance with one aspect of the present disclosure.

BET transforms are calculated from isotherms using the standard BET method and BET transforms and linear fits for toluene adsorbed on activated carbon, water adsorbed on mol sieve, and toluene adsorbed on mol sieve are shown in FIGS. 4-6, respectively. FIG. 4 illustrates BET transforms and linear fits of toluene on activated carbon. FIG. 5 illustrates BET transforms and linear fits of water on the mol sieve. FIG. 6 illustrates BET transforms and linear fits of toluene on the mol sieve. BET transforms show highly linear behavior with best fit lines demonstrating $R^2>0.99$. Porous solid specific surface areas (SSAs) are readily calculated using the slope and intercept of the fitted line, and results are summarized in Table 1 below, and uncertainties reflect standard deviations.

TABLE 1

Specific surface area of isotherms

| | Specific Surface Area ($m^2/g$) | | | |
|---|---|---|---|---|
| | Nitrogen | Argon | Water | Toluene |
| Mol Sieve | 599.7 | 567.0 | 595.6 ± 2.7 | 565.1 ± 21.0 |
| Activated Carbon | 802.0 | 642.3 | — | 496.1 ± 5.8 |

For mol sieve porous solids, the thermogravimetrically determined water BET SSA is 595.6±2.7 $m^2/g$ and toluene BET SSA is 565.1±21.0 $m^2/g$. For comparison, cryogenic physisorption gives a nitrogen BET SSA of 599.7 $m^2/g$ and an argon SSA of 567.0 $m^2/g$ for mol sieve. All four SSA measurements show good agreement within a range of 35 $m^2/g$, or 6% of the mean value. This agreement of the BET SSAs is particularly impressive considering that the corresponding isotherms reveal significantly different adsorbed volumes in the relevant $P/P_S$ range of 0.05 to 0.25, as shown in FIG. 2. SSAs of activated carbon show much more variance than mol sieve SSAs with nitrogen and argon BET surface areas of 802.0 $m^2/g$ and 642.3 $m^2/g$ respectively. Unlike mol sieve, the BET SSAs of activated carbon are clearly dependent upon the choice of adsorbent; toluene on activated carbon demonstrates a surface area of 496.1±5.8 $m^2/g$. BET theory is not applicable to water adsorbed on activated carbon as water does not form a multilayer on activated carbon, as shown in FIG. 3, so no BET SSA can be calculated for this system.

BET SSAs are highly consistent across four different adsorbents for the highly ordered mol sieve, suggesting that these surfaces area could reasonably be interpreted as geometric surface areas. The BET SSAs for activated carbon show much greater variation, indicating that SSAs for activated carbon are instead dependent on the properties of the adsorbent molecule. BET SSAs of activated carbons have been shown to be heavily dependent on the choice of adsorbate molecule.

In addition to the widely used SSA, BET analysis also produces a BET constant. BET constants are generally not reported because they are specific to the adsorbate used, typically nitrogen, which is seldom the chemical of interest to the system being studied. The BET constant is a non-dimensional measure of the strength of the interaction between adsorbate and the adsorbent. BET constants for water and toluene adsorbed on mol sieve are 24.7±1.2 and 10.6±0.9, respectively, as shown in Table 2, and uncertainties reflect standard deviations. The greater value for water may indicate that mol sieve has a higher affinity for water than toluene.

TABLE 2

BET Constants of mol sieve and activated carbon.

| | BET Constants (unitless) | | | |
|---|---|---|---|---|
| | Nitrogen | Argon | Water | Toluene |
| Mol Sieve | −275.5 | 1699.6 | 24.7 ± 1.2 | 10.6 ± 0.9 |
| Activated Carbon | 7,715 | 950.3 | — | 52.0 ± 3.7 |

Toluene on activated carbon has a BET constant of 52.0±3.7, demonstrating that activated carbon has a high affinity for toluene. This finding is consistent with and supports the use of activated carbon for toluene adsorption. Water exhibits only weak interactions with the relatively hydrophobic activated carbon, with very little volume adsorbed at $P/P_S<0.3$, indicating that there is no meaningful multilayer formation within this range and BET theory cannot be applied. The nitrogen BET constant of nitrogen adsorbed on mol sieve is negative, which occurs somewhat frequently for cryogenic physisorption. Negative BET constants violate the assumptions of BET theory and are physically meaningless. BET constants for argon adsorbed on mol sieve and activated carbon are 1699.6 and 950.3 respectively. These large values, and the large BET constant of 7,715 for nitrogen on activated carbon, are due to small y-intercept values of the BET linear fits (~4.106 g/mL)

Kelvin Analysis

Figure 7:
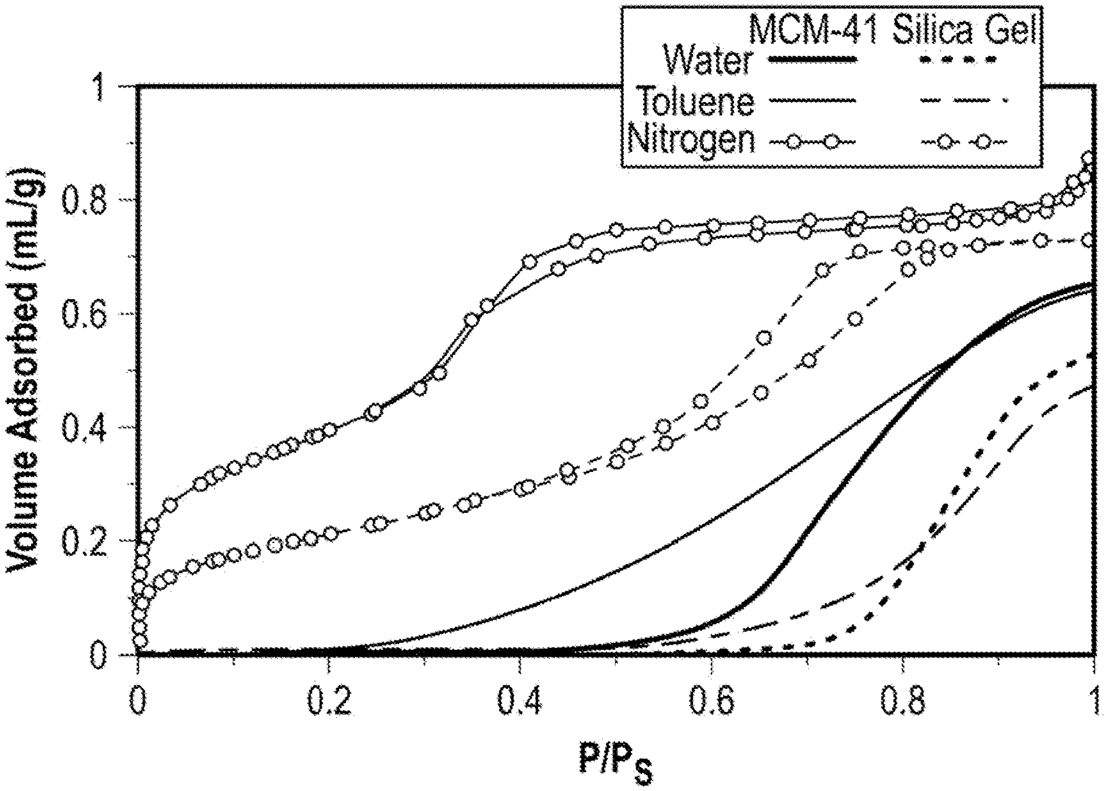
FIG. 7 is a chart illustrating isotherms of water, toluene, and nitrogen on silica gel and MCM-41 in accordance with one aspect of the present disclosure.

Adsorbent/adsorbate systems that produce Type III or V isotherms, such as water on activated carbon shown in FIG. 3, show no evidence of coherent multilayer formation with essentially no volume adsorbed at $P/P_S<0.2$. Thus, for these systems, adsorption is governed predominantly by capillary condensation. For wetting fluids, liquid is more energetically stable within small capillaries and pores as compared with the bulk liquid state. Sufficiently small capillaries can condense gas into liquid well above the saturation temperature, or below the saturation pressure, of the gas. Adsorption of water on activated carbon is difficult to model accurately due to the large contact angle so adsorption on silica gel and Mobil Composition of Matter No. 41 (MCM-41) are examined here instead. Isotherms of water and toluene adsorbed on MCM-41 and silica gel measured using thermogravimetric desorption are shown in FIG. 7, along with nitrogen isotherms measured using cryogenic physisorption. The nitrogen isotherms show standard Type IV behavior with significant volume adsorbed at $P/P_S<0.05$ indicating multilayer formation. In contrast, toluene adsorbed on MCM-41 shows no appreciable volume adsorbed at $P/P_S<0.2$ while the remaining three water and toluene systems show no appreciable volume adsorbed at $P/P_S<0.5$. As no coherent multilayer appears for the water and toluene systems, BET is not applicable and the Kelvin equation may be applied.

Figure 8:
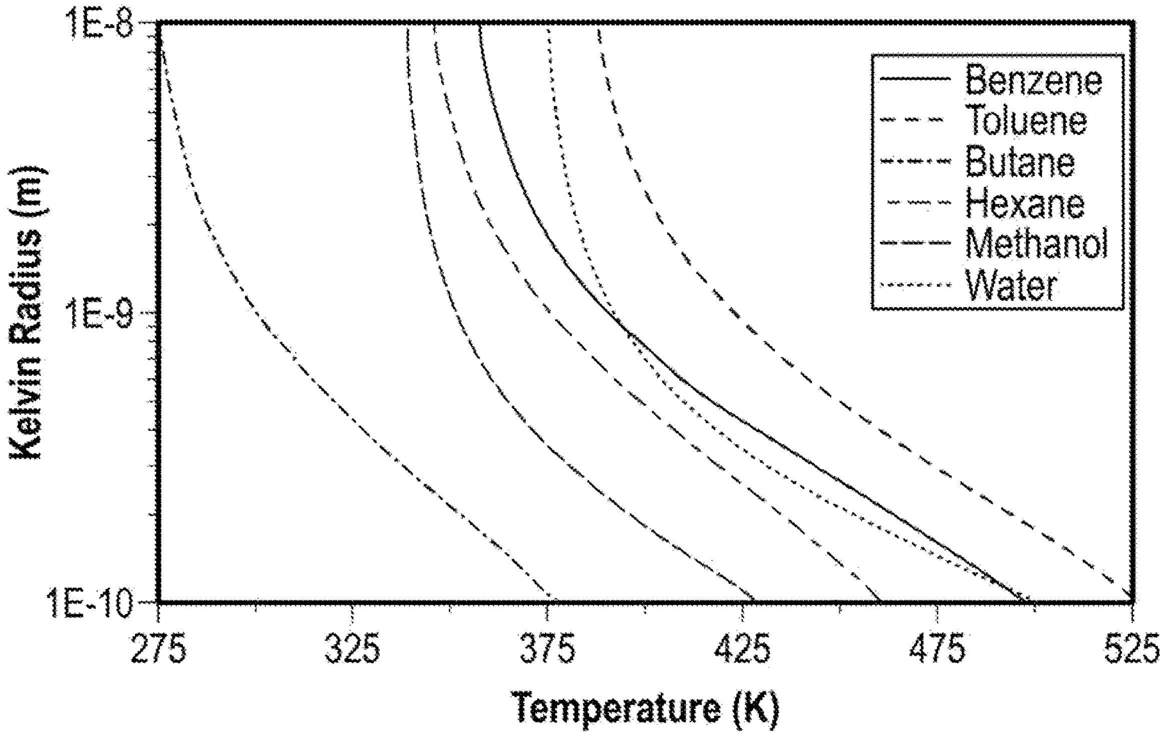
FIG. 8 is a chart illustrating Kelvin radii of several common fluids at 1 atm in accordance with one aspect of the present disclosure.

The Kelvin equation can be reformulated for constant pressure, thermogravimetric desorption, and Kelvin radii for several common chemicals at 1 atm are shown in FIG. 8. The common chemicals may include benzene, toluene, butane, hexane, methanol, and water. Large pores are emptied at low temperatures, just above the boiling point of the adsorbate, and progressively smaller pores empty as temperature increases and $P/P_S$ decreases. Kelvin radii show the same general shape across the six fluids indicating that the method applied here for water and toluene can work for other common chemicals including alkanes, aromatics, alcohols, and others.

Figure 9:
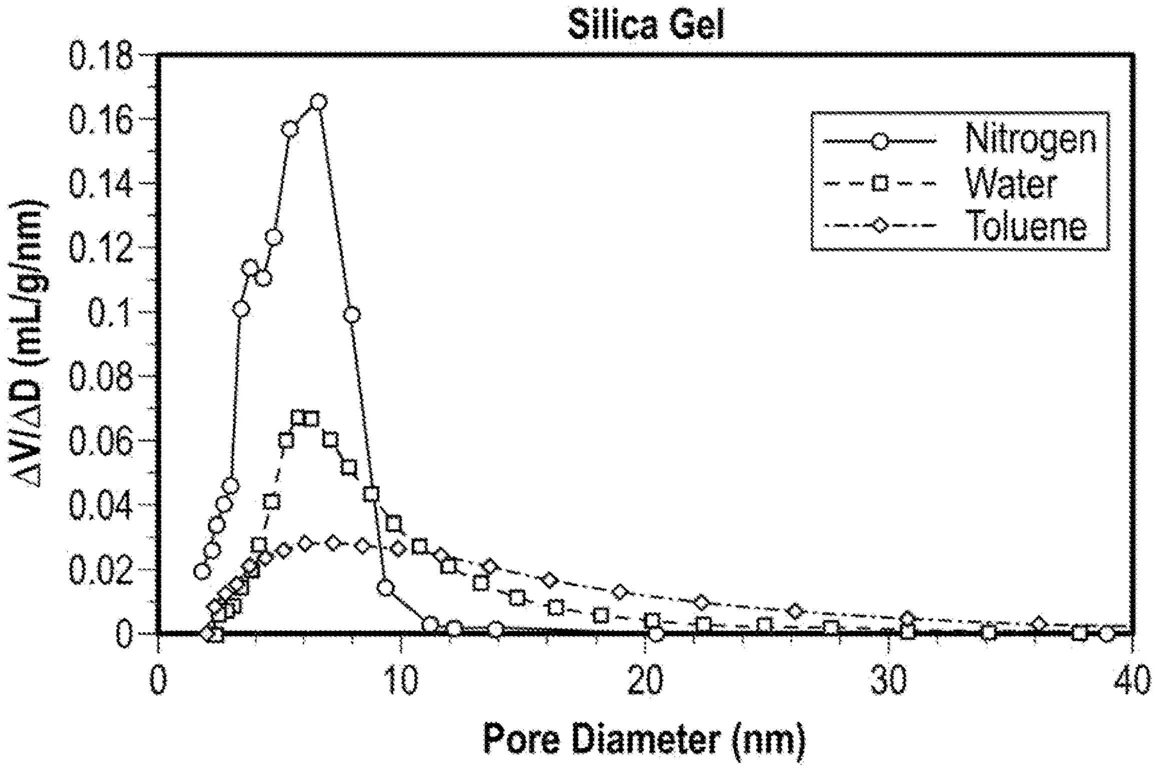
FIG. 9 is a chart illustrating pore size distributions of silica gel determined from nitrogen, water, and toluene desorption in accordance with one aspect of the present disclosure.

Applying the Kelvin equation to thermogravimetric desorption data allows the pore size distribution of a porous solid to be calculated. FIG. 9 shows the pore size distributions of silica gel, determined using the thermogravimetric desorption technique and water and toluene adsorbates. Uncertainties show standard deviations. For comparison, a pore size distribution derived from cryogenic nitrogen physisorption is also shown. All three distributions show the peak pore size falling between 6 nm and 7 nm, suggesting that the thermogravimetric desorption method can determine peak pore size using various adsorbates with comparable accuracy to cryogenic nitrogen physisorption. Total pore volumes and specific surface areas (SSAs) for all three adsorbents are shown in Table 3 below, where nitrogen BET SSA is also shown for comparison. Uncertainties show standard deviation.

TABLE 3

Pore size distribution from nitrogen, water, and toluene on silica gel.

| | SSA ($m^2/g$) | Pore volume (mL/g) |
|---|---|---|
| Nitrogen | 546.7 | 0.728 |
| Water | 288.9 ± 26.2 | 0.501 ± 0.003 |
| Toluene | 186.2 ± 41.8 | 0.473 ± 0.079 |

The nitrogen pore volume for silica gel is 45% greater than the water pore volume, and the toluene pore volume is within experimental error of the water. The importance of these results can be illustrated through consideration of the adsorbent/adsorbate systems. For example, as silica gel is commonly used as a desiccant, water adsorption capacity is an important measurement and nitrogen physisorption overestimates the available pore volume of this adsorbent to water.

The BET nitrogen analysis also overestimates the SSA of silica gel compared to water by 75%, and this difference is due to a greater volume of nitrogen adsorbed and significant water adsorption in pores >10 nm diameter, as larger pores have a lower surface area-to-volume ratio. The pore size distribution of toluene on silica gel has a longer tail at larger pore diameters than those of water and nitrogen, with significant pore volume in pores larger than 20 nm and a correspondingly lower surface area. Despite this behavior, toluene does accurately predict the peak pore size.

Figure 10:
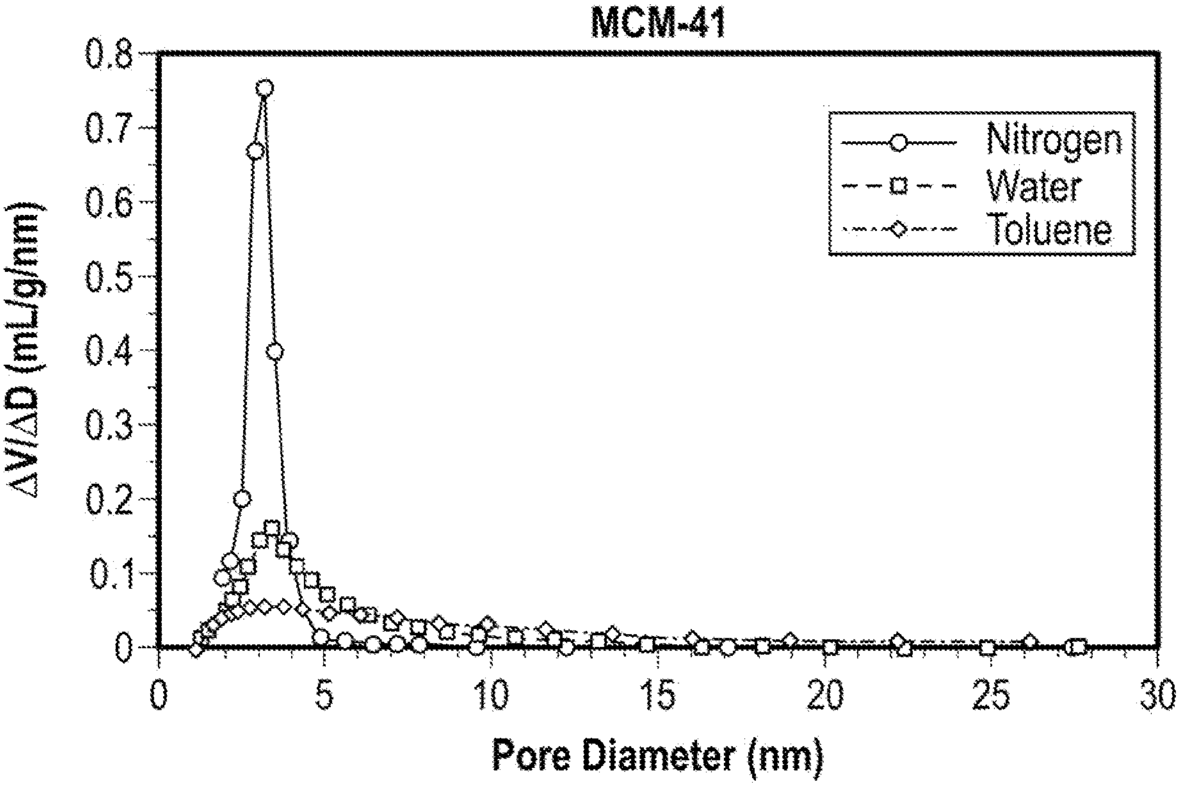
FIG. 10 is a chart illustrating pore size distributions of MCM-41 determined from nitrogen, water, and toluene desorption in accordance with one aspect of the present disclosure.

FIG. 10 illustrates pore size distributions of MCM-41 as determined using the thermogravimetric desorption technique with water and toluene adsorbates, and the Kelvin equation. For comparison, the BET pore size distribution derived from cryogenic nitrogen physisorption is also shown. Results for MCM-41 show similar trends compared to silica gel: nitrogen shows a narrow pore size distribution with the majority of pore volume falling between 2 nm and 4 nm, and a peak pore size of 3.2 nm. The pore size distribution from water shows the same peak pore size of 3.2 nm, although the distribution is broader with significant specific pore volume between 5 nm and 10 nm. The toluene pore size distribution also shows a broader pore size distribution than for nitrogen, but results show good agreement with peak pore size.

Nitrogen pore volume in MCM-41 is 47% greater than water, as shown in Table 4, consistent with other results showing greater adsorption of nitrogen. Uncertainties show standard deviations. Water shows slightly greater pore volume on MCM-41 compared to toluene, but this difference is within experimental error. SSAs of MCM-41 show greater nitrogen values compared to water and toluene, consistent with the trends observed for silica gel.

TABLE 4

Pore size distribution from nitrogen, water, and toluene on MCM-41.

| | SSA ($m^2/g$) | Pore volume (mL/g) |
|---|---|---|
| Nitrogen | 1,075.5 | 0.906 |
| Water | 600.2 ± 17.5 | 0.617 ± 0.016 |
| Toluene | 425.5 ± 96.5 | 0.661 ± 0.041 |

Nitrogen isotherms on silica gel, FIG. 7, and mol sieve, FIG. 3, show that both of these common desiccants form nitrogen multilayers. Thermogravimetric desorption using water shows that mol sieve does not form a coherent multilayer with water, but instead adsorbs water predominantly by capillary condensation. As the main purpose of these desiccants is to adsorb water the thermogravimetric method accurately captures the behavior of this common system.

Methods

Experimental

Figure 12:
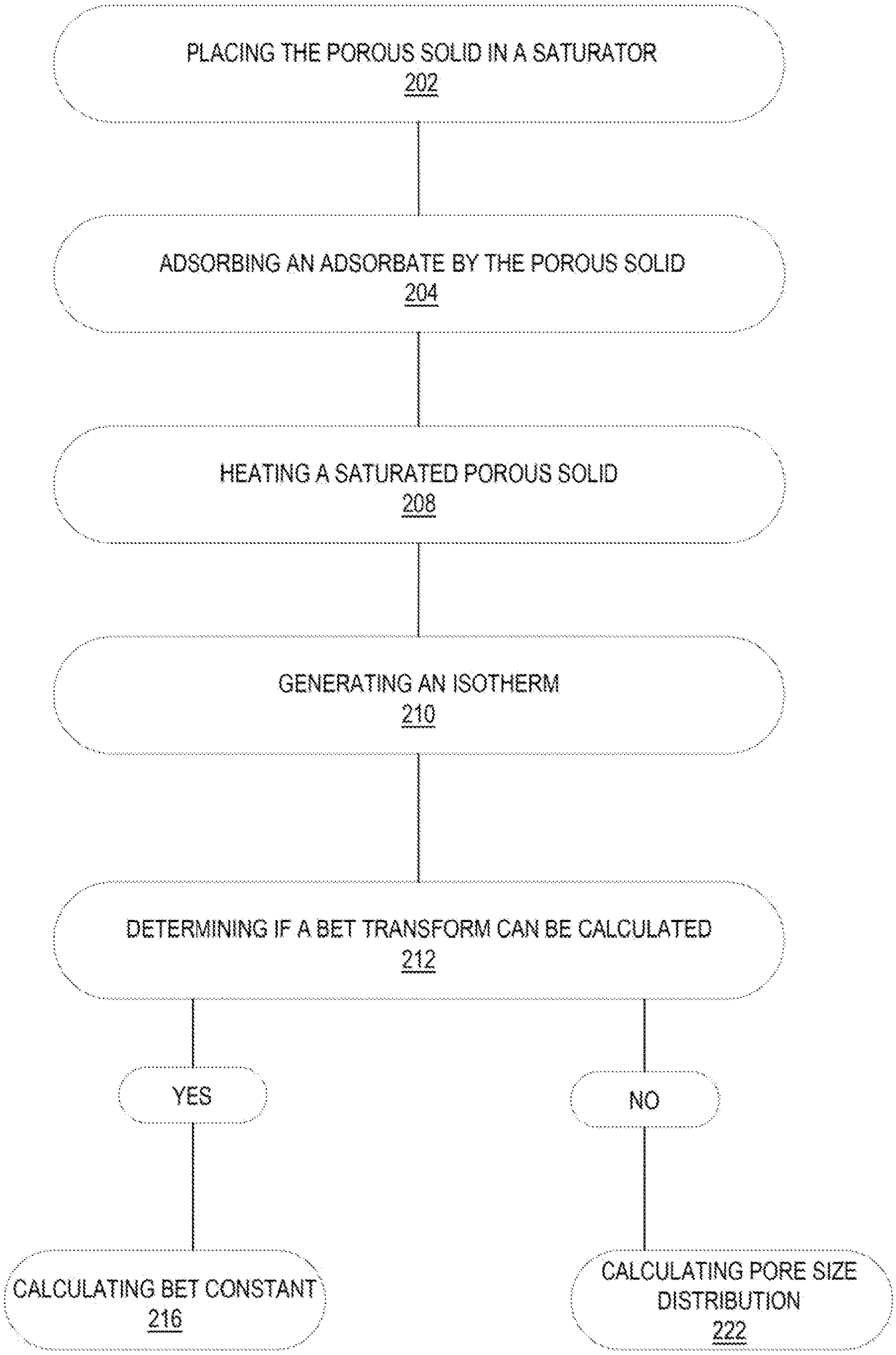
FIG. 12 is a flow chart illustrating a method for quantifying porous material in accordance with one aspect of the present disclosure.
Figure 13:
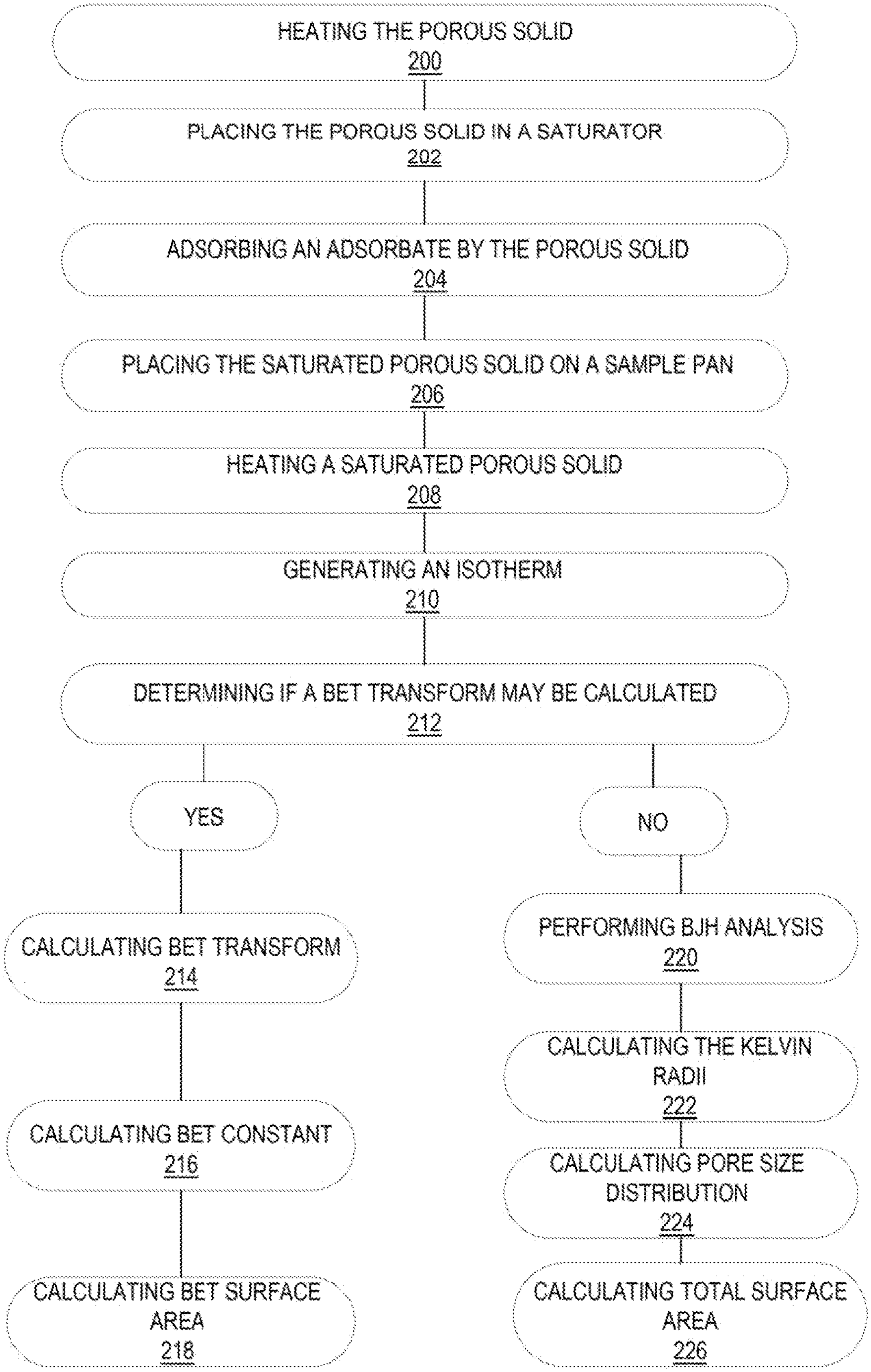
FIG. 13 is a flow chart illustrating another method for quantifying porous material in accordance with one aspect of the present disclosure.

FIGS. 12 and 13 are flow charts illustrating a method for quantifying porous material. First, the porous solid 12, such as activated carbon, 13× molecular sieve 100-120 mesh, MCM-41, and silica gel 230-400 mesh 60 Å, may be heated to ensure desorption of water and other contaminants (Step 200). For example purposes only, the porous solid 12 may be heated to 200° C. in a vacuum oven for 24 hours. Next, the porous solid 12 is placed or put in a saturator 18 (Step 202). For example, approximately 0.5 g of solid was placed in the bottom of the porous solid holder 28, for example a glass jar of 7.5 cm diameter by 14 cm height may be used. In other aspects of the present disclosure, the porous solid holder 28 may be larger or smaller. The adsorbate 16 is placed in the adsorbate holder 20. For example, approximately 14 mL of liquid adsorbate may be placed in a glass test tube measuring 16 mm outer diameter and 99 mm length. In other aspects of the present disclosure, the adsorbate holder 20 may be larger or smaller. Once the adsorbate holder 20 is filled with adsorbate 16, the adsorbate holder 20 may be placed in the porous solid holder 28. For example, the test tube may be placed in the jar and an air-tight lid is screwed onto the top of the jar. Next, the porous solid adsorbs the adsorbate (Step 204). The complete saturator 18 may be placed on the bench for a minimum time such as 48 hours to allow the porous solid 12 to adsorb vapor, the minimum time may be higher or lower.

Thermogravimetric Analysis (TGA)

Next, the saturated porous solid 22 is placed on the sample pan 24 (Step 206; FIG. 13). The sample pan 24 may be sealable, such as by a lid with a pinhole. The sample pan may also be part of a thermal analyzer machine. For example, 4-6 mg of sample may be loaded into an aluminum Tzero Differential Scanning calorimetry (DSC) pan and pan may be sealed with an aluminum Tzero hermetic lid with 75

μm diameter pinhole. The sample pan 24, or sealed DSC pan, may then be placed on a TGA pan and loaded on to the TGA machine. The TGA pan may be platinum. The balance of the TGA may be tared with an empty sample pan 24 and the TGA pan prior to loading the saturated porous solid 22. In some aspects of the present disclosure the hermetically sealed sample pan 24 with pinhole lid allows adsorptive gas to desorb from porous solid sample with evolved gas escaping through the pinhole. The pinhole is sufficiently small to prevent diffusion of ambient gas into the sample pan 24, thus maintaining an environment which can be approximated as pure adsorptive gas within the pan.

In one aspect of the present disclosure, the use of a sealed pan with a pinhole lid may be essential, or necessary. The saturated porous solid 22 is loaded into an aluminum pan that is sealed with a lid, such as one with a 75 μm diameter pinhole. The sealed pan may contain adsorbate gas that is desorbed from the saturated porous solid 22. This may maintain a gas environment around the sample of 100% adsorbate gas, which may be highly advantageous. The sealed pan maintains this environment while the pinhole in the lid allows the adsorbate gas to escape so the pressure does not increase while being small enough to prevent TGA flow gas from diffusing into the pan. In some aspects of the present disclosure the pinhole diameter may range from 20 μm to 120 μm or have a larger or smaller diameter. The diameter size used may be dependent on the mass of the saturated porous solid 22 or the porous solid 12.

A TGA may be used to analyze the samples. The TGA may be calibrated using the Curie temperature method with alumel and nickel. The TGA may be calibrated by other methods. The Curie temperatures of alumel and nickel, 154.2° C. and 357.0° C. respectively, correspond to the temperature range of mass loss of the water and toluene, along with other common adsorbents, allowing the TGA to be precisely calibrated in the relevant temperature range.

Next the saturated porous solid 22 may be heated (Step 208). The saturated porous solid 22 may be heated to a first temperature over a first period of time or until the saturated porous solid 22 reaches the boiling point of the adsorbate 16 and then heated to a second temperature over a second period of time or until the porous solid 22 reaches a specific temperature. The boiling point of the adsorbate 16 may be defined as the temperature at which the vapor pressure of the adsorbate is equal to the ambient pressure (e.g., 93° C. for water at 0.78 atm). For example, the saturated porous solid may be heated at 40° C./min to the boiling point of the adsorbate and then 2° C./min to 550° C.

For saturated porous solids 22 displaying Type III isotherms, all mass loss may end by approximately 150° C.; in other aspects of the present disclosure, all mass loss may occur at a higher or lower temperature. The TGA or other heating element 26 may heat the sample or saturated porous solid 22 at specified rate(s). The first specific rate may start from room temperature to some temperature of interest, such as the boiling point of the adsorbate. The second rate may cover a range of interest, such as the adsorbate boiling point to a maximum temperature. The maximum temperature may range from 200-600° C. or be higher or lower. There may be a region from room temp to the range of interest where no analysis is conducted. During heating in this region, adsorbate gas can diffuse out of the pinhole and nitrogen can diffuse in, creating an environment within the sample pan 24 that is less than 100% adsorbate. To reduce the time in this region, a fast temperature ramp rate may be used to minimize the amount of time the saturated porous solid 22 spends in the temperature range of this region. The temperature ramp rate used may be dependent on the heating element 26 or on what TGA instrument is used. The temperature ramp rate may be based on the choice of instrument used. In some aspects of the present disclosure the temperature ramp rate may be 40° C./min. Reasonable range of temperature ramp rates may include 10° C./min to 500° C./min and could be higher or lower.

In some aspects of the present disclosure, once the temperature reaches the boiling rate of the adsorbate, the temperature ramp rate may need to be slowed down. This may allow for better resolution. The slowed down temperature ramp rate may be either 2° C./min or 0.5° C./min but in some aspects, may range between 0.2° C./min to 10° C./min or be higher or lower.

In some aspects of the present disclosure, the vapor pressure of adsorbate gas in proximity must be non-zero and known. In conventional physisorption methods, the sample container is filled only with the adsorbate gas (typically $N_2$) and the absolute pressure is carefully monitored. In at least one of the methods disclosed in the present disclosure the sample or saturated porous solid 22 may be placed in a sealed pan with a pinhole lid. As the temperature rises adsorbate evaporates, filling the pan. The environment within the pan is thus nearly 100% adsorbate gas and at a pressure equal to the ambient (typically 1 atm, or 0.78 atm in Laramie WY) thus satisfying that the vapor pressure is non-zero and known.

Several TGA instruments exist that can maintain a set humidity level (partial pressure of water) within the sample cell. In some aspects of the present disclosure, the TGA sample cell could be set to maintain a constant, nonzero partial pressure of water with the remainder being inert gas, such as $N_2$, Ar, or other inert gases. Porous solid loaded with water adsorbate, or the saturated porous solid 22, could then be loaded into the TGA without using the sealed pan with pinhole lid. The TGA, while maintaining a constant environment containing set water partial pressure level, could be heated in the same fashion as above, such as at a temperature ramp rate of 2° C./min to 550° C., to desorb the water from the sample. Analysis would be conducted in the same fashion with the partial pressure of the water vapor being controlled. In this aspect, the heating rates do not have to be fine-tuned as much nor do DSC pans with pinhole lids have to be used. Analogous implementation could be achieved for other, non-water adsorbates if appropriate equipment is available, such as a TGA which can maintain a partial pressure of another adsorbate, other than water, in the sample cell.

The saturated porous solids 22 displaying Type III isotherms may be rerun during the heating step. The rerun may use a lower heat rating, such as 0.5° C./min, to allow for better temperature resolution over the mass loss range, as shown in Table 5.

TABLE 5

Temperature methods used for TGA desorption and analysis methods applied to derived isotherms, categorized by IUPAC isotherm Type.

| Isotherm Type | Step 1 | Step 2 | Analysis Method |
|---|---|---|---|
| I, II, IV | 40° C./min to boiling point | 2° C./min to 550° C. | BET |
| III, V | 40° C./min to boiling point | 0.5° C./min to 200° C. | Kelvin |

Gas, such as a purge gas, may flow through the TGA. The gas may include nitrogen, argon, or any other gas. For example, flow rates of nitrogen purge gas may be 40 mL/min balance and 60 mL/min sample, the standard flows for the TGA. All example tests herein were conducted in Laramie, WY, where the atmospheric pressure is 0.78 atm and all calculations were conducted using this pressure. All TGA tests were performed in triplicate and mean values reported. Nitrogen physisorption was conducted using a Micromeritics ASAP 2020. Argon physisorption was performed by MSE analytical services.

Calculations

Next, the isotherm may be generated or derived (Step 210). In one aspect of the present disclosure, all calculations were performed in MATLAB. The mass of adsorbate adsorbed onto the porous solid per unit mass of solid at a given temperature, $X_a(T)$, may be calculated from TGA mass loss traces using Eq. 1

$$X_a(T) = \frac{m(T) - m_f}{m_f} \quad [1]$$

where m(T) is the sample mass at temperature T as measured by TGA, and $m_f$ is the final sample mass as measured by TGA. All mass loss is assumed to be due to desorption when analyzed microporous and mesoporous materials are synthesized at high temperatures and therefore assumed to be stable at the moderate temperatures (≤550° C.) employed in this technique. Adsorbate volume per unit mass of solid at T may be found by dividing $X_a(T)$ by the temperature-dependent liquid adsorbate density, ρ(T), Eq. 2. Density values may be obtained from National Institute of Standard and Technology.

$$v_a(T) = \frac{X_a(T)}{\rho(T)} \quad [2]$$

Cryogenic physisorption typically defines relative pressure as $P/P^0$, where P is the pressure of adsorbate gas and $P^0$ is the bulk saturation pressure of the adsorbate. Cryogenic physisorption is typically conducted isothermally and at the saturation temperature of the adsorbate corresponding to atmospheric pressure, making $P^0$ constant and equal to atmospheric pressure, while P is varied from sub-atmospheric to atmospheric pressure. In contrast, for the thermogravimetric method presented here, P is constant and equal to ambient pressure while the saturation pressure is increased from ambient to approximately 5.0 MPa, depending on the adsorbate and maximum desorption temperature achieved in the TGA. The saturation vapor pressure is denoted as $P_S$ for the thermogravimetric method to avoid mistaking this value as the constant saturation pressure of the cryogenic physisorption technique, while noting that the physical meaning of $P_S$ remains unchanged from $P^0$.

Isotherms may be generated from TGA mass loss data by first mapping temperature to $P/P_S$. $P/P_S$, as shown in Eq. 3, is a function of temperature only $$\frac{P}{P_S} = \frac{P}{P_S(T)} \quad [3]$$

where the temperature at every experimental time step is measured and reported by the TGA. The partial pressure of adsorptive gas, P, within the DSC sample pan 24 is assumed constant and equal to the ambient pressure. The saturation pressure, $P_S$, is found from tabulated thermodynamics data at each analyzed temperature.

Isotherms may then be constructed by plotting $v_a(T)$ (Eq. 2) versus $P/P_S$. Produced isotherms may not extend to $P/P_S$ of 0 because this mapping requires the saturation pressure of the adsorbate, which is a function of temperature, and saturation pressure is only defined up to the critical temperature of the adsorbate. These critical temperatures are 319° C. for toluene and 374° C. for water, and it is not possible to map to isotherm space above these temperatures, or below the corresponding $P/P_S$, for each adsorbate. Due to the large saturation pressures of toluene and water as temperatures approach the critical temperatures, the unmappable region is relatively small; at a P of 0.078 MPa, toluene could not be mapped at $P/P_S<0.025$ and water at $P/P_S<0.005$.

BET transforms may be calculated from isotherms in the conventional manner described by Eq. 4 (Step 214).

$$BET\ \text{Transform} = \frac{1}{v_a\left(1 - \frac{P}{P_S}\right)} \quad [4]$$

The Rouquerol criteria may be applied to determine the appropriate range of $P/P_S$ for BET analysis. The normalized adsorption isotherm (NAI) may be calculated by Eq. 5.

$$NAI = v^a\left(1 - \frac{P}{P_S}\right) \quad [5]$$

The upper limit of the $P/P_S$ range over which BET analysis is applied may be determined for each adsorbent-adsorbate system by finding the $P/P_S$ at which maximum NAI occurred. For the example systems to which BET analysis was applied herein, the upper bounds of $P/P_S$ for water/mol sieve, toluene/mol sieve, and toluene/activated carbon were found to be 0.21, 0.27, and 0.19 respectively. The lower limit of the BET range for all systems was selected to be $P/P_S$ of 0.05 due to data noise at lower $P/P_S$.

The volume of the BET monolayer, $v_{ml}$, and the BET constant, c, may be obtained using the standard BET equations given by Eq. 6 and 7 (Step 216).

$$v_{ml} = \frac{1}{A + I} \quad [6]$$

$$c = 1 + \frac{A}{I} \quad [7]$$

where A and I are the slope and intercept, respectively, of the BET transform linear fit. BET surface areas may then be found by dividing the monolayer volume, $v_{ml}$, by the monolayer thickness of the adsorbate. The monolayer thickness for water was taken to be 0.30 nm and the monolayer thickness for toluene was taken to be 0.34 nm in the examples herein.

In some aspects of the present disclosure, pore size distributions may be calculated for saturated porous solids 22 that exhibit multilayer formation and are suitable for BET analysis, such as by applying BJH analysis to the isotherms (Step 220). The calculations applied in steps 222 and 224 below may be used to calculate the pore size distribution for saturated porous solids which do not exhibit multilayer formation.

The Kelvin equation can be used to describe filling and emptying of pores at temperatures above, or pressures below, saturation values based on bulk ambient conditions due to differences in vapor pressure at a curved liquid-vapor interface, such as the surface of adsorbate within a pore. The Kelvin equation can be rearranged to yield Eq. 8.

$$r = \frac{2 \cdot \gamma \cdot v \cdot \cos\theta}{\ln\left(\frac{P_S}{P}\right) R \cdot T} \quad [8]$$

where γ is adsorbate surface tension, ν is adsorbate specific volume on a molar basis, θ is the contact angle between liquid adsorbate and the porous solid, R is the ideal gas constant, T is absolute temperature, $P_S$ is the saturation pressure of the liquid at a flat interface, and P is the saturation pressure of the liquid over a hemispherical meniscus of radius r. In typical cryogenic physisorption, the temperature of the sample is kept constant (e.g., at −196° C. for nitrogen physisorption) and the surface tension, molar volume, and flat-interface saturation pressure are approximated as constant over the range of tested pressures. However, when Kelvin pore radius or radii or are calculated (Step 222) isobarically over a temperature range from approximately the adsorbate boiling point to the critical point in the thermogravimetric desorption method, P is constant and equal to the ambient pressure while the values of γ, ν, and $P_S$ vary. Tabulated values for γ, ν, and $P_S$ can be obtained from NIST as functions of temperature, allowing Kelvin radii to be determined over the range of temperatures achieved in the TGA during thermogravimetric desorption. Contact angles can be measured using the sessile drop method for systems to which Kelvin analysis was applied, and example results are tabulated in Table 6. Contact angles are not needed for systems to which BET analysis was applied.

TABLE 6

Contact angles measured and used for Kelvin analysis.

| | Silica Gel | MCM-41 |
|---|---|---|
| Water | 17° | 25° |
| Toluene | 10° | 10° |

Water and toluene have low (≤25°) contact angles on MCM-41 and silica gel. As the Kelvin equation uses the cosine of the contact angle, the results of the Kelvin equation are relatively insensitive to changes in contact angle at small contact angles, and error resulting from uncertainty in contact angle measurements is relatively low. In contrast, activated carbon is relatively hydrophobic, producing large contact angles with water and making Kelvin equation results sensitive to the contact angle. For example, taking the contact angle between activated carbon and water to be 75° produces a surface area of 1,443 $m^2/g$, but an uncertainty in contact angle of ±2° results in the surface area varying from 1,256 $m^2/g$ to 1,644 $m^2/g$. As such, Kelvin analysis is most accurately applied to systems that exhibit low contact angles in order to avoid the uncertainty associated with large contact angles. As an alternative approach for such systems, the surface energies of the solid-vapor and solid-liquid interfaces can be used in lieu of the contact angle for greater accuracy.

In order to calculate a Kelvin pore size distribution from TGA desorption data, approximately 50 temperature points may be chosen between the boiling point of the tested adsorbate and the maximum tested temperature. Average temperatures may then be calculated between adjacent temperature points using Eq. 9.

$$T_n = \frac{T_i + T_{i+1}}{2} \quad [9]$$

The loss of adsorbate mass per unit mass of adsorbent between temperature analysis points ($\Delta X_{a,n}$) may be calculated using Eq. 10.

$$\Delta X_{a,n} = X_{a,i} - X_{a,i-1} \quad [10]$$

The rate of adsorbate mass loss with temperature increase may be approximated with Eq. 11, and a $P/P_S$ corresponding to $$\frac{dX_a}{dT} = 5 \times 10^{-4} K^{-1}$$

may be used as the lower bound for pore size analysis. This lower bound is chosen as it can be consistently applied across different systems and corresponds to >99% of total mass loss.

$$\frac{dX_a}{dT} \cong \frac{\Delta X_{a,n}}{T_{i+1} - T_i} \quad [11]$$

The change in volume of adsorbed adsorbate per unit mass of adsorbent between temperature analysis points ($\Delta V_n$) may be calculated using Eq. 12.

$$\Delta V_n = \frac{\Delta X_{a,n}}{\rho(T_n)} \quad [12]$$

where $\Delta V_n$ is the total pore volume drained during step n per unit mass of adsorbent, and $\rho(T_n)$ is density of the liquid adsorbate as a function of temperature. The change in Kelvin radius over the temperature step, $\Delta r_n$, may be calculated using Eq. 13.

$$\Delta r_n = \frac{2 \cdot \gamma(T_n \cdot v(T_n) \cdot \cos\theta}{\ln\left(\frac{P_S(T_i)}{P}\right) R \cdot T_i} - \frac{2 \cdot \gamma(T_{i+1}) \cdot v(T_{i+1}) \cdot \cos\theta}{\ln\left(\frac{P_S(T_{i+1})}{P}\right) R \cdot T_{i+1}} \quad [13]$$

The effective Kelvin radius for the temperature step was calculated using Eq. 14.

$$r_n = \frac{2 \cdot \gamma(T_n) \cdot v(T_n) \cdot \cos\theta}{\ln\left(\frac{P_S(T_n)}{P}\right) R \cdot T_n} \quad [14]$$

Cylindrical pores may be assumed, and the area of pores drained per change in pore radius during step n may then be calculated (Step 224) using Eq. 15.

$$\frac{\Delta A_n}{\Delta r_n} = \frac{2\Delta V_n}{\Delta r_n \cdot r_n} \quad [15]$$

The total surface area of the porous solid is equal to the integral of differential surface area over pore radius, and this may be numerically evaluated (Step 226) using the trapezoidal method, Eq. 18.

$$\text{Surface Area} = \int_{r_N}^{r_1} \frac{\Delta A}{\Delta r} dr = \frac{1}{2}\sum_{n=1}^{N}(r_n - r_{n+1})\left[\frac{\Delta A_n}{\Delta r_n} + \frac{\Delta A_{n+1}}{\Delta r_{n+1}}\right] \quad [18]$$

The above analysis may be applied to TGA-derived isotherms.

The disclosure is not to be limited to the particular embodiments described herein. In particular, the disclosure contemplates numerous variations in quantifying porous material. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of embodiments, processes or methods of the disclosure. It is understood that any other modifications, substitutions, and/or additions can be made, which are within the intended spirit and scope of the disclosure.

What is claimed is:

1. A method for quantifying porous material, the method comprising:

placing a porous solid in a saturator;

adsorbing an adsorbate by the porous solid to form a saturated porous solid;

thermally desorbing the saturated porous solid in a closed container with a pinhole by heating the saturated porous solid in a thermogravimetric analysis (TGA) machine;

generating an isotherm;

mapping desorption data to the isotherm using thermos data to determine if a BET transform can be calculated utilizing the isotherm;

calculating a surface area and BET constant if the BET transform is calculated; and calculating a pore size distribution and surface area if the BET transform is not calculated.

2. The method of claim 1, wherein the heating comprises heating the saturated porous solid to a first temperature until a boiling point of the adsorbate is reached and then heating the saturated porous solid to a second temperature.

3. The method of claim 1, wherein the adsorbate is a liquid.

4. The method of claim 1, wherein the adsorbate is a dissolved solid.

5. The method of claim 1, wherein saturation of the porous solid includes a multilayer formation of the adsorbate on the porous solid.

6. The method of claim 1, further comprising:

calculating a surface area of the saturated porous solid.

7. The method of claim 1, further comprising application of Density Functional Theory (DFT) or Dubinin-Radushkevich theory to the calculated isotherm.

8. A method for quantifying porous material, the method comprising:

placing a porous material in a sealed saturator;

saturating the porous material with an adsorbate in the sealed saturator;

placing the saturated porous material in a thermogravimetric analysis (TGA) machine and in a controlled chemical composition environment, such as within a sealed pan with a pinhole lid;

heating the saturated porous material in the TGA machine, wherein the heating comprises heating the saturated porous material to a first temperature and then heating the saturated porous material to a second temperature;

generating an isotherm;

mapping the mass loss measured from the heated saturated porous material, to the isotherm using thermos data; and determining if a BET transform of the porous material may be calculated utilizing the isotherm.

9. The method of claim 8, further comprising:

calculating a BET transform;

calculating a BET constant; and calculating a specific surface area.

10. The method of claim 8 further comprising:

calculating a Kelvin radius distribution;

calculating pore size and pore volume distributions; and calculating a specific surface area.

11. The method of claim 8, wherein the isotherm is derived for a liquid adsorbate.

12. The method of claim 8, wherein the isotherm is derived for a dissolved solid adsorbate.

13. The method of claim 8, wherein saturation of the porous solid is determined to include a multilayer formation of the adsorbate on the porous solid.

14. The method of claim 8, wherein saturation of the porous solid is determined to include a monolayer formation of the adsorbate on the porous solid.

15. A system for quantifying porous material, the system comprising:

a porous solid;

a controlled chemical composition environment comprising a closed container with a pinhole;

an adsorbate, wherein the adsorbate comprises at least one of a gas, a liquid, or a dissolved solid;

a saturator, wherein the saturator is configured to saturate the porous solid with the adsorbate; and a thermogravimetric analysis (TGA) machine configured to thermally desorb the saturated porous solid in the closed container with the pinhole by heating the saturated porous solid to generate an isotherm;

wherein desorption data is mapped to the isotherm using thermos data to determine if a BET transform of the porous solid can be calculated.

16. The system of claim 15, wherein the TGA machine is configured to heat the saturated porous material at a first temperature until a boiling point of the adsorbate is reached.

17. The system of claim 15, wherein a BET constant of the porous solid is calculated.

18. The system of claim 15, wherein a pore size distribution is calculated utilizing at least the TGA machine.

19. The system of claim 15, wherein a specific surface area of the porous solid is calculated.

20. The system of claim 15, wherein the TGA machine maintains an atmosphere surrounding the porous solid containing a known partial pressure of adsorbate.

* * * * *